US007387040B2

(12) United States Patent
Eaton et al.

(10) Patent No.: US 7,387,040 B2
(45) Date of Patent: Jun. 17, 2008

(54) METHODS AND SYSTEMS FOR MOUNTING SENSORS FOR USE IN A HARSH VIBRATION ENVIRONMENT

(75) Inventors: William F. Eaton, Pearl City, IL (US); Aaron J. Meyers, Cedarville, IL (US)

(73) Assignee: Honeywell International Inc., Morristown, NJ (US)

( * ) Notice: Subject to any disclaimer, the term of this patent is extended or adjusted under 35 U.S.C. 154(b) by 405 days.

(21) Appl. No.: 11/207,453

(22) Filed: Aug. 19, 2005

(65) Prior Publication Data

US 2007/0039397 A1 Feb. 22, 2007

(51) Int. Cl.
*G01D 3/036* (2006.01)

(52) U.S. Cl. ........................................ 73/866.5; 29/450

(58) Field of Classification Search ..............................
29/525.05–525.06, 446–447, 450–451, 453; 73/866.5; 248/638
See application file for complete search history.

(56) References Cited

U.S. PATENT DOCUMENTS

| | | | | |
|---|---|---|---|---|
| 3,140,614 | A * | 7/1964 | Willis | 73/729.2 |
| 4,050,307 | A * | 9/1977 | McMullen et al. | 73/335.14 |
| 4,132,237 | A * | 1/1979 | Kennedy et al. | 137/75 |
| 4,524,038 | A | 6/1985 | Heinemann et al. | 264/61 |
| 4,665,376 | A | 5/1987 | Heinrich | 338/176 |
| 4,665,740 | A * | 5/1987 | Matsumoto et al. | 73/116 |
| 4,715,220 | A * | 12/1987 | Eitoku et al. | 73/118.1 |
| 4,774,626 | A * | 9/1988 | Charboneau et al. | 361/283.4 |
| 5,191,178 | A | 3/1993 | Baker | 200/61.88 |
| 5,338,907 | A | 8/1994 | Baker et al. | 200/61.88 |
| 5,348,267 | A * | 9/1994 | Lanting et al. | 248/638 X |
| 5,454,270 | A * | 10/1995 | Brown et al. | 73/720 |
| 5,889,284 | A * | 3/1999 | Mattis | 250/577 |
| 6,405,593 | B1 | 6/2002 | Palfenier et al. | 73/493 |
| 6,470,739 | B1 * | 10/2002 | Matsumura et al. | 73/118.2 |
| 6,813,952 | B2 * | 11/2004 | Yamashita et al. | 73/708 |
| 6,898,972 | B2 | 5/2005 | Bauer et al. | 73/504.12 |
| 7,339,612 | B1 * | 3/2008 | Yajima | 348/208.7 |
| 2004/0150144 | A1 | 8/2004 | Goepfert et al. | 267/136 |
| 2004/0182163 | A1 | 9/2004 | Yamashita et al. | 73/708 |
| 2004/0187559 | A1 | 9/2004 | Yokoi | 73/35.01 |

(Continued)

FOREIGN PATENT DOCUMENTS

DE 7607712 U1 12/1976

(Continued)

*Primary Examiner*—Thomas P Noland
(74) *Attorney, Agent, or Firm*—Kermit D. Lopez; Luis M. Ortiz

(57) ABSTRACT

A sensor is associated with a mounting surface. An O-ring is then positioned between the sensor and the mounting surface, such that the O-ring is compressible when the sensor is fixed to the mounting surface. A fixing mechanism is generally provided for permanently fixing the sensor to the mounting surface, such that the O-ring located between the sensor and the mounting surface provides a proper tension thereof which prevents the sensor from being adversely affected by vibration resulting from a harsh vibration environment in which the sensor operates. The fixing mechanism can be implemented as a fixing joint between the sensor and the mounting surface. Additionally, the O-ring and the sensor are configured with respect to one another and the mounting surface to maintain tension in the fixing joint.

21 Claims, 3 Drawing Sheets

U.S. PATENT DOCUMENTS

| | | | | |
|---|---|---|---|---|
| 2004/0201464 | A1 | 10/2004 | Oonishi | 340/436 |
| 2004/0211875 | A1 | 10/2004 | Wisniewski et al. | |
| 2005/0076725 | A1 * | 4/2005 | Heiland | 73/866.5 X |
| 2005/0149464 | A1 | 7/2005 | Nugent | 706/20 |
| 2005/0149465 | A1 | 7/2005 | Nugent | 706/26 |
| 2005/0151615 | A1 | 7/2005 | Nugent | 338/13 |
| 2006/0171704 | A1 * | 8/2006 | Bingle et al. | 396/419 |
| 2007/0085248 | A1 * | 4/2007 | Chang | 248/638 X |
| 2008/0078259 | A1 * | 4/2008 | Duff | 73/866.5 |

FOREIGN PATENT DOCUMENTS

| | | | | | |
|---|---|---|---|---|---|
| EP | 629785 | A2 | * | 12/1994 | 403/278 |
| JP | 61053525 | A | * | 3/1986 | 431/78 |
| JP | 07009567 | | | 1/1995 | |
| JP | 2001215139 | A | * | 8/2001 | |
| JP | 2001 332878 | | | 11/2001 | |

* cited by examiner

METHODS AND SYSTEMS FOR MOUNTING SENSORS FOR USE IN A HARSH VIBRATION ENVIRONMENT

TECHNICAL FIELD

Embodiments are generally related to sensor methods and systems. Embodiments are also related to methods and systems for configuring and implementing sensors. Embodiments are additionally related to components for maintaining sensors.

BACKGROUND OF THE INVENTION

A wide variety of solid-state sensors are used in a variety of commercial and industrial applications. For example, such sensors are actively used in pressure and temperature sensing applications. In general, a sensor can be thought of as a device that responds to a stimulus, such as heat, light, or pressure, and generates a signal that can be measured or interpreted. Such sensors typically incorporate some form of a sensing element, which is a basic component that usually changes some physical parameter to an electrical signal for detection purposes.

Some sensors are based on magnetic components. For example, magnetic position sensors can include digital and analog Hall Effect position sensors, magnetoresistive digital sensors, Hall Effect vane sensors, gear tooth sensors, Hall Effect basic switch, and magnets. Magnetic Position Sensors are reliable, high speed, long life sensors and are directly compatible with other electronic circuits.

These sensors respond to the presence or the interruption of a magnetic field by producing either a digital or an analog output proportional to the magnetic field strength. Digital and analog "sensor-only" devices are operated by the magnetic field from a permanent magnet or electromagnet. Actuation mode depends on the type of magnets used. Integral magnet position sensors can be operated by either a vane passing through a gap or a magnet mounted on a plastic plunger. Positions sensors, for example, are typically used in applications that require accurate, reliable outputs. They are found in brushless DC motors, utility meters, welding equipment, vending machines, home appliances, computers, and so on.

Other types of sensors include force sensors, mass airflow sensors, silicon pressure sensors, and stainless steel pressure sensors. Force sensors, for example, are utilized for precise reliable performance in compact commercial grade packages. Amplified and unamplified microbridge mass airflow sensors typically provide a sensitive and fast response to the flow of air or other gas over the chip. Silicon pressure sensors usually contain sensing elements that include piezoresistors buried in the face of a thin, chemically-etched silicon diaphragm. A pressure change causes the diaphragm to flex, inducing a stress or strain in the diaphragm and the buried resistors. Resistor values change in proportion to the stress applied to produce an electrical output. Stainless steel pressure sensors, on the other hand, range from miniature surface mount sensors to high-end stainless steel isolated transmitters used for stringent process control.

One of the problems with current sensors and sensor packaging technology is that such devices require expensive over-molds or post-mold inserted bushings along with costly components such as bolts with thread locking mechanisms. Such devices are particularly susceptible to assembly errors or damage caused by vibration in a high vibration environment. Vibration can often result in so-called "cold flow" or other deformations of the sensor or sensor mounting surface, which can negatively affect the sensor performance.

Based on the foregoing it is believed that an improved sensor method and system is necessary to overcome these problems. Such an improved sensor, including methods and systems thereof, is disclosed herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor methods and systems.

It is another aspect of the present invention to provide an improved method and system for mounting a sensor to a mounting surface, while avoiding the consequences of harsh vibration environments.

The aforementioned aspects of the invention and other objectives and advantages can now be achieved as described herein. A sensor system and method are disclosed. In general, a sensor is associated with a mounting surface. An O-ring can be positioned between the sensor and the mounting surface, such that the O-ring is compressible when the sensor is fixed to the mounting surface. A fixing mechanism can also be provided for permanently fixing the sensor to the mounting surface, such that the O-ring located between the sensor and the mounting surface provides a proper tension thereof which prevents the sensor from being adversely affected by vibration resulting from a harsh vibration environment in which the sensor operates. The fixing mechanism can be implemented as a fixing joint between the sensor and the mounting surface. Additionally, the O-ring and the sensor are configured with respect to one another and the mounting surface to maintain tension in the fixing joint.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
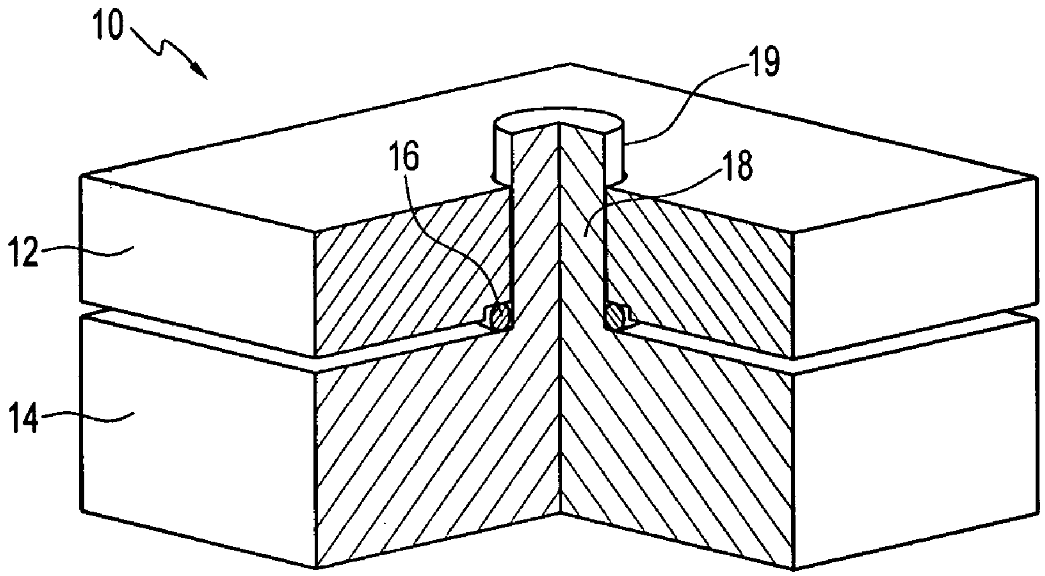
FIG. 1 illustrates a cutaway view of a sensor mounting system, which can be implemented in accordance with a preferred embodiment.
Figure 2:
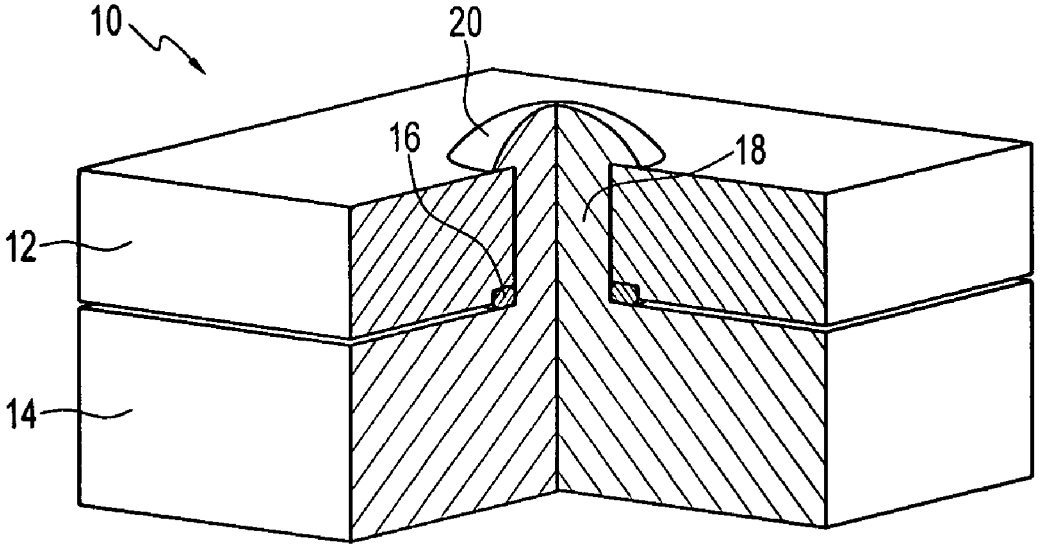
FIG. 2 illustrates a tilted cutaway view of the sensor mounting system depicted in FIG. 1, in accordance with a preferred embodiment.
Figure 3:
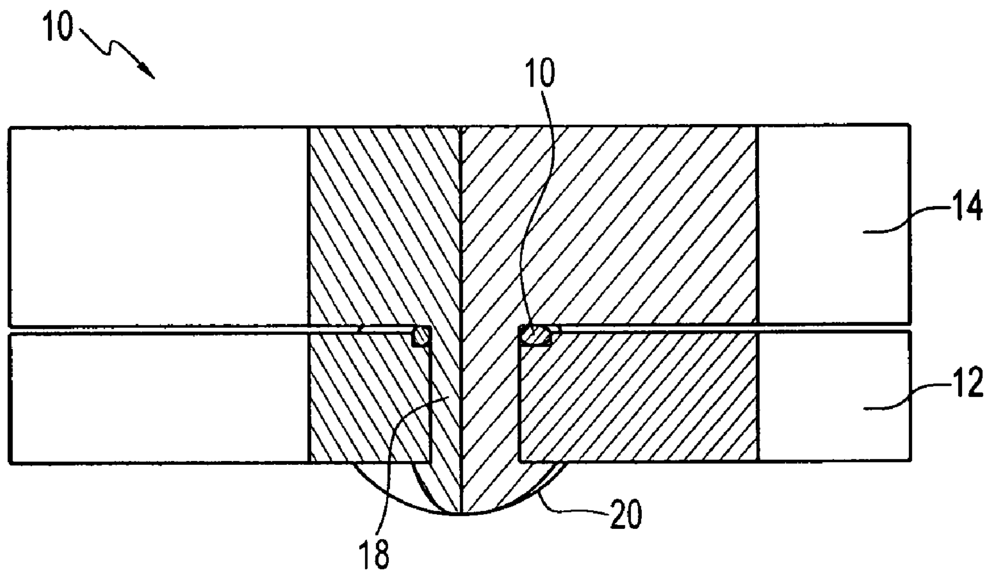
FIG. 3 illustrates a reverse cutaway view of the sensor mounting system depicted in FIGS. 1-2, in accordance with a preferred embodiment.
Figure 4:
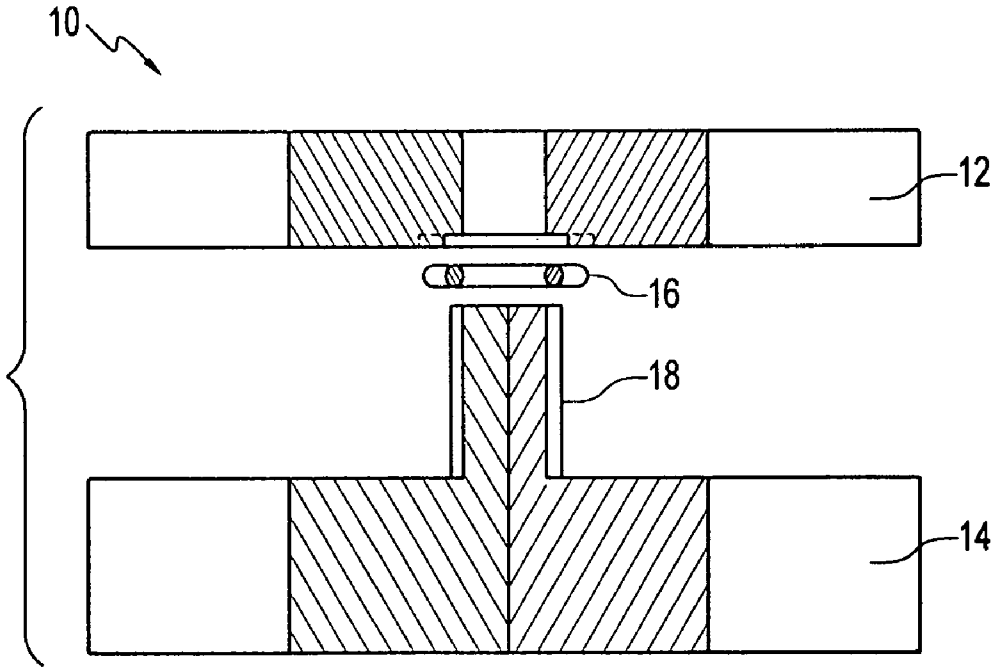
FIG. 4 illustrates a side exploded view of the sensor mounting system depicted in FIGS. 1-3, in accordance with a preferred embodiment.
Figure 5:
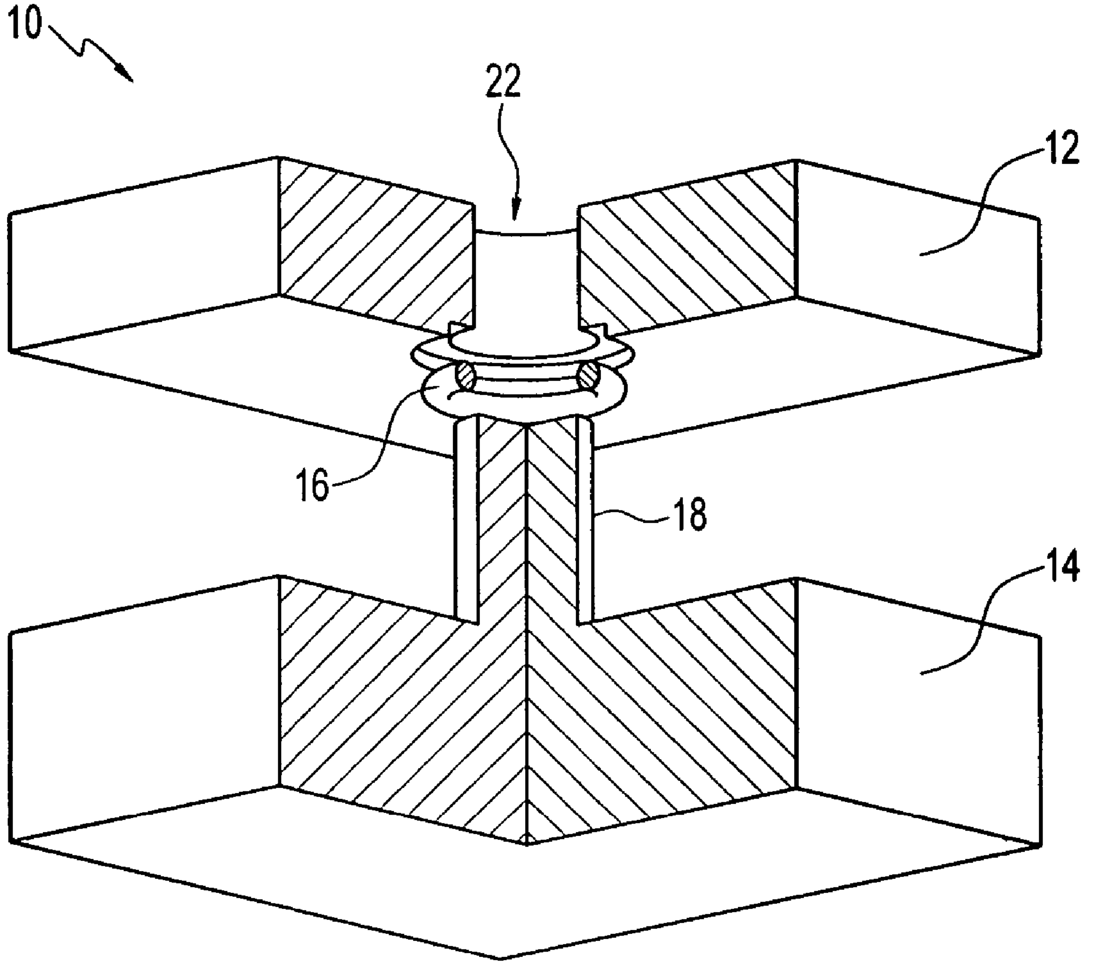
FIG. 5 illustrates a perspective exploded view of the sensor mounting system depicted in FIGS. 1-4, in accordance with a preferred embodiment.

FIG. 1 illustrates a cutaway view of a loose assembly of a sensor mounting system 10, which can be implemented in accordance with a preferred embodiment. FIG. 2 illustrates a tilted cutaway view of the fully assembled sensor mounting system 10 depicted in FIG. 1, in accordance with a preferred embodiment. Similarly, FIG. 3 illustrates a reverse cutaway view of the fully assembled sensor mounting system 10 depicted in FIGS. 1-2, in accordance with a preferred embodiment. Likewise, FIG. 4 illustrates a side exploded view of the components included in the sensor mounting system 10 depicted in FIGS. 1-3, in accordance with a preferred embodiment. Finally, FIG. 5 illustrates a perspective exploded view of the components included in the sensor mounting system 10 depicted in FIGS. 1-4, in accordance with a preferred embodiment. Note that in FIGS. 1-5, identical or similar parts or elements are generally indicated by identical reference numerals.

In general, sensor mounting system 10 includes a sensor 12 associated with a mounting surface 14. An O-ring 16 can be positioned between the sensor 12 and the mounting surface 14, such that the O-ring 16 is compressible when the sensor 12 is fixed to the mounting surface 14. A fixing mechanism 18 can be provided for permanently fixing the sensor 12 to the mounting surface 14, such that the O-ring 16 located between the sensor 12 and the mounting surface 14 provides a proper tension on the fixing mechanism thereof which prevents the sensor 12 from being adversely affected by vibration resulting from a harsh vibration environment in which the sensor 12 operates.

The fixing mechanism 18 can be implemented as a fixing joint between the sensor 12 and the mounting surface 14. In general, the fixing mechanism 18 can be formed from mounting surface 14 and protrude from mounting surface 14 in order to couple with and/or receive sensor 12. Note that the fixing mechanism 18 can form a circular end 19, which protrudes above the top side of sensor 12. Note that as depicted herein, sensor 12 can comprise an actual sensor or, for example, a sensing element that forms a part of larger sensor device or system, depending upon design considerations.

The circular end 19 is depicted generally in FIG. 1. In FIGS. 2 and 3, the fixing mechanism 18 is illustrated as having a dome shaped end portion 20, which can be formed from the circular end 19 such that the O-ring 16 is properly compressed between the sensor 12 and the mounting surface 14. In FIG. 5, a gap 22 is shown configured centrally within sensor 12. Note that gap 22 can be shaped in a cylindrical or a non-cylindrical configuration, depending upon design considerations. Gap 22 can comprise a cylindrical shaped gap for receiving the fixing joint. A non-cylindrically shaped gap, however, can also be implemented. The fixing mechanism 18 thus is surrounded by the O-ring 16 and fits within the gap 22 for a proper fit thereof.

The O-ring 16 and the sensor 12 are generally configured with respect to one another and the mounting surface 14 to maintain tension in the fixing joint or fixing mechanism 18. The sensor 12 can therefore be permanently fixed to the mounting surface 14 utilizing an assembly component, such as, for example O-ring 16, fixing joint 18 and/or other types of components. The preferred mounting of sensor 12 utilizes O-ring 16 positioned between the sensor 12 and the mounting surface 14, such that the O-ring 16 will be compressed when the sensor 12 is fixed to the mounting surface 14. Alternatively, the O-ring 16 can be utilized such that it is compressed between the dome shaped end portion 20 and the sensor 12.

The sensor 12 can then be permanently fixed to the mounting surface 14 utilizing a low-cost assembly method, such as, for example, riveting, heat-staking, snap-fitting, and the like. One alternative example of a low-cost assembly method that can be adapted for use in accordance with the embodiments disclosed herein is "twist-lock" style mounting configuration that employs the o-ring 16 for tension. The use of the O-ring 16 between the sensor 12 and the mounting surface 14 can provide a methodology and system for maintaining proper tension in the fixing joint or fixing mechanism 18 so that the sensor 12 is not affected by vibration, regardless of any "cold flow" or other deformation of sensor 12 or mounting surface 14.

The configuration depicted in FIGS. 1-5 generally provides a fixing method for sensor mounting system 10 that eliminates the need for expensive over-molds or post-mold inserted bushing, along with expensive bolting and assembly operations. The low-cost fixing method (e.g., snap-fit, heat stake, rivet, etc) in association with the compressible O-ring 16 and the fixing joint or fixing mechanism 18 provides several benefits. For example, the fixing joint 18 is expected to loosen over the life of the sensor 12 and resulting sensor product due to temperature cycling, vibration, and so forth. The methodology for sensor mounting system 10 described herein can permanently fix the sensor 12 to the mounting surface 14. The O-ring 16 thus maintains tension in the fixing joint or mechanism 18, regardless of any "cold flow" or other deformation of the sensor 12 or mounting surface 14, so that environmental vibration will not negatively affect the sensor 12.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows. Having thus described the invention what is claimed is:

1. A method for mounting a sensor for use in a harsh vibration environment, said method comprising:

providing a mounting surface for a sensor;

positioning an O-ring between said sensor and said mounting surface, such that said O-ring is compressible when said sensor is fixed to said mounting surface; and thereafter permanently fixing said sensor to said mounting surface utilizing a fixing joint integrated with a dome shaped end portion, wherein said O-ring is compressed between said dome shaped end portion and said sensor, such that said O-ring located between said sensor and said mounting surface provides a proper tension thereof which prevents said sensor from being adversely affected by vibration resulting from a harsh vibration environment in which said sensor operates.

2. The method of claim 1 further comprising configuring said sensor to include a gap for receiving said fixing joint, and wherein permanently fixing said sensor to said mounting surface further comprises permanently fixing said sensor to said mounting surface utilizing an assembly component.

3. The method of claim 1 further comprising configuring said O-ring and said sensor such that said O-ring maintains tension in said fixing joint.

4. The method of claim 1 wherein permanently fixing said sensor to said mounting surface further comprises permanently fixing said sensor to said mounting surface utilizing an assembly component.

5. The method of claim 1 wherein said sensor is permanently fixed to said mounting surface utilizing an assembly component and wherein said O-ring maintains tension in said fixing joint.

6. The method of claim 1 wherein permanently fixing said sensor to said mounting surface further comprises heat staking said sensor to said mounting surface for attachment thereof.

7. The method of claim 1 wherein permanently fixing said sensor to said mounting surface further comprises snap-fitting said sensor to said mounting surface for attachment thereof.

8. The method of claim 1 further comprising configuring said sensor to include a gap for receiving said fixing joint.

9. The method of claim 8 wherein said fixing joint is formed and protrudes from said mounting surface for receipt by said gap associated with said sensor.

10. The method of claim 1 further comprising configuring said sensor to include a gap for receiving said fixing point, wherein said fixing joint is formed and protrudes from said mounting surface for receipt by said gap associated with said sensor.

11. A sensor system, comprising:

a sensor associated with a mounting surface;

an O-ring positioned between said sensor and said mounting surface, such that said O-ring is compressible when said sensor is fixed to said mounting surface;

a fixing mechanism for permanently fixing said sensor to said mounting surface;

a fixing joint between said sensor and said mounting surface; and a dome shaped end portion integrated with said fixing joint, wherein said O-ring is compressed between said dome shaped end portion and said sensor, such that said O-ring located between said sensor and said mounting surface provides a proper tension thereof which prevents said sensor from being adversely affected by vibration resulting from a harsh vibration environment in which said sensor operates.

12. The system of claim 11 wherein said sensor is permanently fixed to said mounting surface utilizing an assembly component and wherein said sensor is configured to include a gap for receiving said fixing joint.

13. The system of claim 11 wherein said O-ring and said sensor are configured with respect to one another and said mounting surface to maintain tension in said fixing joint.

14. The system of claim 11 said sensor is permanently fixed to said mounting surface utilizing an assembly component.

15. The system of claim 11 wherein said sensor includes a gap for receiving said fixing joint, wherein said fixing joint is formed and protrudes from said mounting surface for receipt by said gap associated with said sensor.

16. The system of claim 11 wherein said sensor is permanently fixed to said mounting surface by heat staking said sensor to said mounting surface for attachment thereof.

17. The system of claim 11 wherein said sensor is permanently fixed to said mounting surface by snap-fitting said sensor to said mounting surface for attachment thereof.

18. The system of claim 11 wherein said sensor is configured to include a gap for receiving said fixing joint.

19. The system of claim 18 wherein said fixing joint is formed and protrudes from said mounting surface for receipt by said gap associated with said sensor.

20. The method of claim 11 wherein said sensor includes a gap for receiving said fixing joint and wherein said fixing joint is formed and protrudes from said mounting surface for receipt by said gap associated with said sensor.

21. A sensor system, comprising:

a sensor associated with a mounting surface;

an O-ring positioned between said sensor and said mounting surface, such that said O-ring is compressible when said sensor is fixed to said mounting surface;

a fixing joint for permanently fixing said sensor to said mounting surface, wherein said fixing joint is integrated with a dome shaped end portion, said O-ring compressed between said dome shaped end portion and said sensor, such that said O-ring located between said sensor and said mounting surface provides a proper tension thereof which prevents said sensor from being adversely affected by vibration resulting from a harsh vibration environment in which said sensor operates, wherein said sensor is configured to include a centrally located gap for receiving said fixing joint and wherein said fixing joint is formed and protrudes from said mounting surface for receipt by said centrally located gap associated with said sensor.

* * * * *